(12) United States Patent  (10) Patent No.: US 8,566,573 B1
Lok et al.  (45) Date of Patent: Oct. 22, 2013

(54) SELECTABLE INITIALIZATION FOR ADAPTERS

(75) Inventors: Ying Ping Lok, Ladera Ranch, CA (US); Zhenghao Zhang, Irvine, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 370 days.

(21) Appl. No.: 12/941,621

(22) Filed: Nov. 8, 2010

(51) Int. Cl.
*G06F 9/00* (2006.01)

(52) U.S. Cl.
USPC .............................................. 713/2

(58) Field of Classification Search
USPC ....................................................... 713/1–2
See application file for complete search history.

(56) References Cited

U.S. PATENT DOCUMENTS

| | | | |
|---|---|---|---|
| 6,282,642 B1 * | 8/2001 | Cromer et al. | 713/2 |
| 7,870,301 B2 * | 1/2011 | Arndt et al. | 710/8 |
| 7,987,438 B2 * | 7/2011 | Lin et al. | 716/100 |
| 2006/0116208 A1 * | 6/2006 | Chen et al. | 463/43 |
| 2007/0136733 A1 * | 6/2007 | Park et al. | 718/108 |
| 2010/0005234 A1 * | 1/2010 | Ganga et al. | 711/105 |
| 2010/0228942 A1 * | 9/2010 | Tohana | 711/173 |
| 2010/0257403 A1 * | 10/2010 | Virk et al. | 714/15 |

* cited by examiner

*Primary Examiner* — Kim Huynh
*Assistant Examiner* — Alyaa T Mazyad
(74) *Attorney, Agent, or Firm* — Klein, O'Neill & Singh, LLP

(57) ABSTRACT

The present embodiments provide a mechanism for selecting from among a plurality of initialization sequences to be executed as part of system startup. The present embodiments thus address the problem of certain initialization sequences not executing because they apply to the same function as another initialization sequence that is positioned ahead of the subject initialization sequence in storage of an adapter.

14 Claims, 4 Drawing Sheets

SELECTABLE INITIALIZATION FOR ADAPTERS

TECHNICAL FIELD

The present invention relates to computing systems.

BACKGROUND

A computer network, often simply referred to as a network, is a group of interconnected computers and devices that facilitates communication among users and allows users to share resources. A computing system typically uses initialization instructions to begin operations. Continuous efforts are being made to improve initialization operations.

SUMMARY

The various present embodiments relating to user selectable initialization for adapters have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One of the present embodiments comprises a machine-implemented method for enabling an adapter coupled to a computing system to be initialized according to one of a plurality of initialization sequences based upon a user selection. The computing system includes a processor for executing processor-executable instructions and a plurality of registers for storing information. The method comprises system BIOS (basic input/output system) of the computing system loading an initialization selector module (ISM) into system memory. The method further comprises the system BIOS calling an entry point for the ISM and saving the information stored in the registers in the system memory. The method further comprises the ISM allocating a portion of the system memory and copying itself to the allocated memory portion. The method further comprises the ISM reading a user selection of one of the plurality of initialization sequences. The method further comprises the ISM reading code of the selected initialization sequence and copying the code to an initial segment of the system memory. The method further comprises the ISM restoring the information stored in the registers and executing the selected initialization sequence. The method further comprises the selected initialization sequence removing the ISM from the system memory. The method further comprises the selected initialization sequence beginning normal execution.

Another of the present embodiments comprises an adapter for enabling a computing system to communicate with a plurality of devices in a network. The adapter comprises a first interface for enabling the adapter to communicate with the computing system. The adapter further comprises a second interface for enabling the adapter to communicate with the network. The adapter further comprises a memory for storing processor-executable instructions. The adapter further comprises a processor for executing the instructions. The adapter further comprises storage for storing an initialization selector module (ISM). The ISM enables the adapter to be initialized according to a selected one of a plurality of initialization sequences.

Another of the present embodiments comprises a machine-readable storage medium storing executable instructions, which when executed by a computing system, cause the computing system to perform a process for enabling an adapter coupled to the computing system to be initialized according to one of a plurality of initialization sequences based upon a user selection. The computing system includes a processor for executing processor-executable instructions and a plurality of registers for storing information. The process comprises system BIOS (basic input/output system) of the computing system loading an initialization selector module (ISM) into system memory. The process further comprises the system BIOS calling an entry point for the ISM and saving the information stored in the registers in the system memory. The process further comprises the ISM allocating a portion of the system memory and copying itself to the allocated memory portion. The process further comprises the ISM reading a user selection of one of the plurality of initialization sequences. The process further comprises the ISM reading code of the selected initialization sequence and copying the code to an initial segment of the system memory. The process further comprises the ISM restoring the information stored in the registers and executing the selected initialization sequence. The process further comprises the selected initialization sequence removing the ISM from the system memory. The process further comprises the selected initialization sequence beginning normal execution.

BRIEF DESCRIPTION OF THE DRAWINGS

The various present embodiments relating to selectable initialization for adapters now will be discussed in detail with an emphasis on highlighting the advantageous features. These novel and non-obvious embodiments are depicted in the accompanying drawings, which are for illustrative purposes only. These drawings include the following figures, in which like numerals indicate like parts.

DETAILED DESCRIPTION

Figure 1:
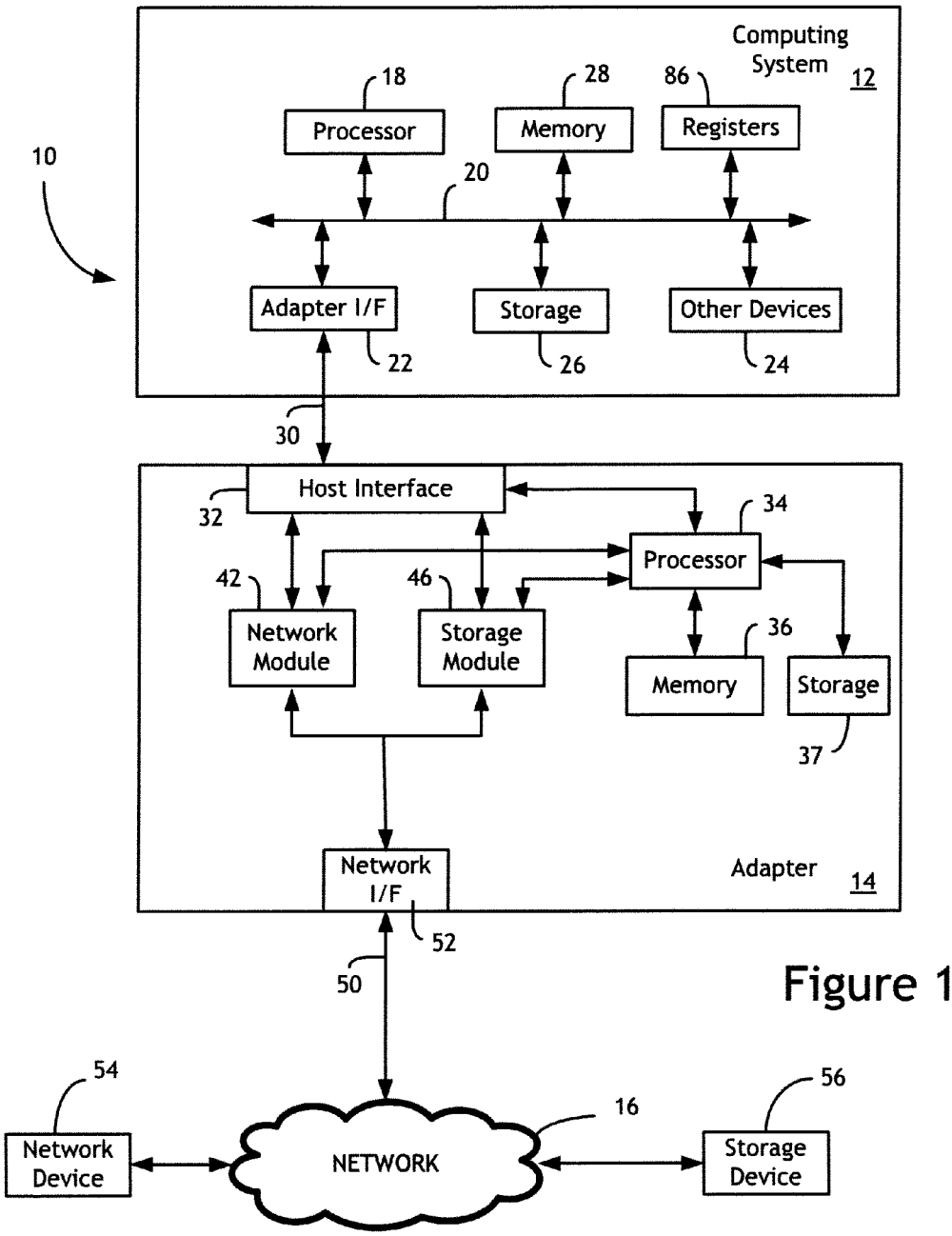
FIG. 1 is a functional block diagram of a computing system coupled to a network through an adapter.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

FIG. 1 is a block diagram of a system 10 configured for use with the present embodiments. The system 10 includes a computing system 12 (may also be referred to as "host system 12") coupled to an adapter 14 that interfaces with a network 16. The network 16 may include, for example, additional computing systems, servers, storage systems, etc. The computing system 12 may include one or more processors 18, also known as a central processing unit (CPU). The processor 18 executes computer-executable process steps and interfaces with a computer bus 20. An adapter interface 22 facilitates the ability of the computing system 12 to interface with the adapter 14, as described below. The computing system 12 also includes other devices and interfaces 24, which may include a display device interface, a keyboard interface, a pointing device interface, etc.

The computing system 12 may further include a storage device 26, which may be for example a hard disk, a CD-ROM, a non-volatile memory device (flash or memory stick) or any other device. Storage 26 may store operating system program files, application program files, and other files. Some of these files are stored on storage 26 using an installation program. For example, the processor 18 may execute computer-executable process steps of an installation program so that the processor 18 can properly execute the application program.

Memory 28 also interfaces to the computer bus 20 to provide the processor 18 with access to memory storage. Memory 28 may include random access main memory (RAM). When executing stored computer-executable process steps from storage 26, the processor 18 may store and execute the process steps out of RAM. Read only memory (ROM, not shown) may also be used to store invariant instruction sequences, such as start-up instruction sequences or basic input/output system (BIOS) sequences for operation of a keyboard (not shown).

Figure 3:
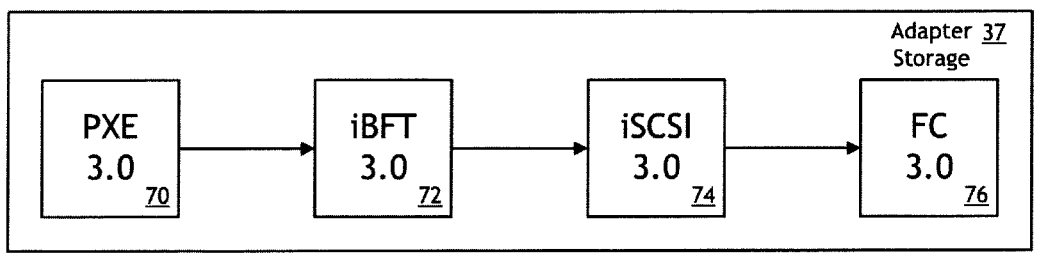
FIG. 3 is a functional block diagram of a memory device including a plurality of initialization sequences.

With continued reference to FIG. 3, a link 30 and the adapter interface 22 couple the adapter 14 to the computing system 12. The adapter 14 may be configured to handle both network and storage traffic. Various network and storage protocols may be used to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 Gbps. The descriptions of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage protocol used to access storage systems is Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port.

A new and upcoming standard, called Fibre Channel Over Ethernet (FCOE) has been developed to handle both Ethernet and Fibre Channel traffic in a storage area network (SAN). This functionality would allow Fibre Channel to leverage 10 Gigabit Ethernet networks while preserving the Fibre Channel protocol. The adapter 14 shown in FIG. 1 may be configured to operate as an FCOE adapter and may be referred to as FCOE adapter 14. QLogic Corporation, the assignee of the present application, provides one such adapter. The illustrated adapter 14, however, does not limit the scope of the present embodiments. The present embodiments may be practiced with adapters having different configurations.

The adapter 14 interfaces with the computing system 12 via the link 30 and a host interface 32. In one embodiment, the host interface 32 may be a Peripheral Component Interconnect (PCI) Express interface coupled to a PCI Express link. The adapter 14 may also include a processor 34 that executes firmware instructions out of memory 36 to control overall adapter 14 operations.

The adapter 14 may also include a processor 34 that executes firmware instructions out of memory 36 to control overall adapter operations. The adapter 14 may also include storage 37, which may be for example non-volatile memory, such as flash memory, or any other device. The storage 37 may store executable instructions and operating parameters that can be used for controlling adapter operations.

The adapter 14 includes a network module 42 for handling network traffic via a link 50. In one embodiment, the network interface 42 includes logic and circuitry for handling network packets, for example, Ethernet or any other type of network packets. The network module 42 may include memory buffers (not shown) to temporarily store information received from other network devices 54 and transmitted to other network devices 54.

The adapter 14 may also include a storage module 46 for handling storage traffic to and from storage devices 56. The storage interface 44 may further include memory buffers (not shown) to temporarily store information received from the storage devices 56 and transmitted by the adapter 14 to the storage devices 56. In one embodiment, the storage module 46 is configured to process storage traffic according to the Fibre Channel storage protocol, or any other protocol.

The adapter 14 also includes a network interface 52 that interfaces with a link 50 via one or more ports (not shown). The network interface 52 includes logic and circuitry to receive information via the link 52 and pass it to either the network module 42 or the storage module 46.

Figure 2:
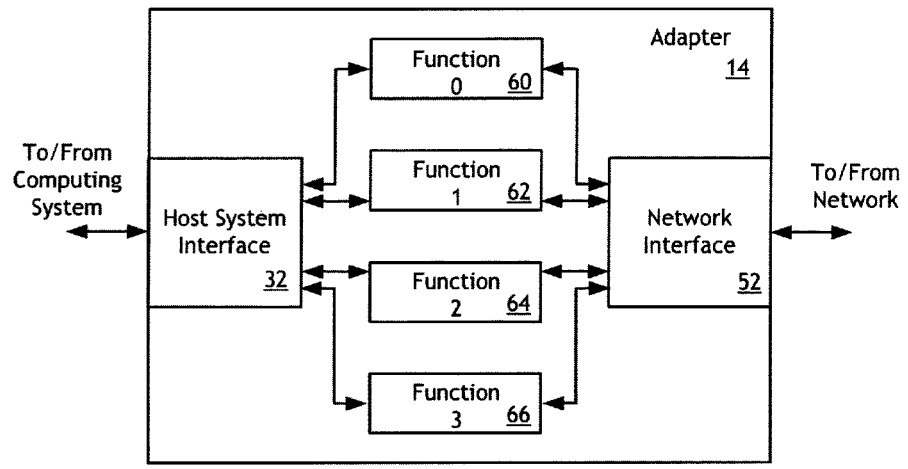
FIG. 2 is a functional block diagram of an adapter.

With reference to FIG. 2, in the illustrated embodiment the adapter 14 may use one or more functions 60, 62, 64, 66, labeled as function 0 (60), function 1 (62), function 2 (64) and function 3 (66). While four functions are illustrated, the adapter 14 may include any number of functions. The functions 60, 62, 64, 66 may be, for example, Peripheral Component Interconnect (PCI) Express functions (referred to herein as PCI functions), or any other type of functions. A PCI function is a logical device for the adapter 14. A PCI function may include a set of standardized PCI control/status registers, which a driver in the computing system 12 uses to communicate with the adapter 14, and user-defined logic (control path, data path, processors and others) that is associated with those registers. A PCI function may be a subset of a PCI Express device.

The Basic Input/Output System (BIOS) of a computing system is processor executable code. System BIOS, also referred to as boot firmware, is the first code run by the computing system when it is powered on. It is typically stored in non-volatile storage. The primary function of the BIOS is to load and start an operating system. When the computing system starts up, the first job for the BIOS is to initialize and identify system devices such as a video display card, keyboard and mouse, hard disk, CD/DVD drive, and other hardware. The BIOS then locates software held on a peripheral device (designated as a "boot device"), such as a hard disk or a CD, and loads and executes that software, giving it control of the computing system. This process is known as booting, or booting up.

During boot up, the system BIOS reads initialization sequences from the adapter's storage. The adapter's storage may contain more than one initialization sequence. The system BIOS reads each of these initialization sequences and loads them, one by one, into the memory of the computing system for execution. However, the system BIOS may only load one sequence for each active function. If two sequences apply to the same function, the system BIOS will only load the first one that it scans.

For example, FIG. 3 illustrates the adapter storage 37 containing four initialization sequences: Preboot eXecution Environment (PXE) 70, Internet Small Computer System Interface (iSCSI) Boot Firmware Table (iBFT) 72, iSCSI 74 and FC 76. Upon system startup, the BIOS of the computing system 12 reads these initialization sequences and loads them, one by one, into the memory 28 of the computing system 12 for execution. However, the system BIOS only loads one sequence for each active function. If two sequences apply to the same function, the system BIOS will only load the first one that it scans. For example, PXE 70 and iBFT 72 may both apply to the same function, and in FIG. 3 PXE 70 is stored ahead of iBFT 72. Thus, in the example of FIG. 3 the system BIOS will only load PXE 70 and will not load iBFT 72. The location of initialization sequences within the adapter's storage can thus affect whether or not a particular initialization sequence gets executed.

PXE, also known as Pre-Execution Environment, is an environment to boot computers using a network interface independently of data storage devices (like hard disks) or installed operating systems. iBFT is a component of the Advanced Configuration and Power Interface (ACPI) 3.0b standard that provides operating systems a standard way to boot from software-initiated iSCSI protocol.

One aspect of the present embodiments includes the realization that it is undesirable for the location of an initialization sequence within an adapter's storage to affect whether or not that initialization sequence gets executed. This scenario can cause an initialization sequence to never get executed. It would thus be desirable to provide greater control over what initialization sequences stored in the adapter get executed. The present embodiments provide such control.

Figure 4:
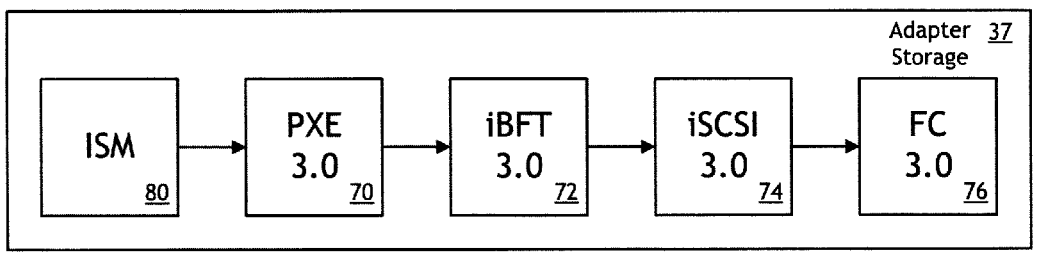
FIG. 4 is a functional block diagram of a memory device including a plurality of initialization sequences and an initialization selector module (ISM), according to the present embodiments.

The present embodiments provide an initialization selector module (ISM) 80 that may stored at adapter storage 37. The functionality of the ISM 80 is described below. With reference to FIG. 4, in one embodiment the ISM 80 is located in the adapter storage 37 such that it is ahead of every initialization sequence 70, 72, 74, 76. Thus, upon system startup the system BIOS reads the ISM 80 prior to reading any of the initialization sequences 70, 72, 74, 76.

The ISM 80 is processor executable code for enabling a user to control which initialization sequence(s) 70, 72, 74, 76 will be executed at system startup. FIGS. 5-9 illustrate one embodiment of a method for enabling user control over initialization sequence execution using the ISM 80.

Figure 5:
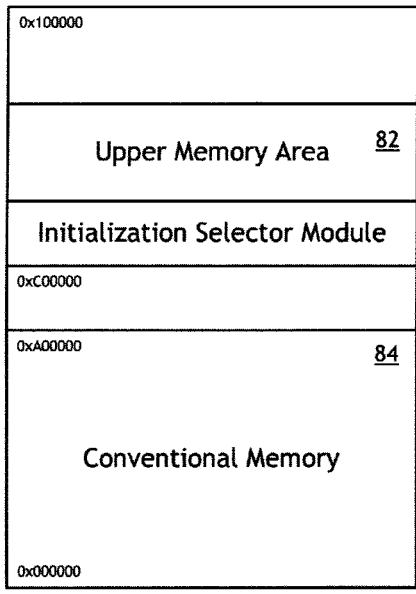
FIG. 5 is a functional block diagram of a memory device illustrating contents of the memory at one point of a method according to the present embodiments.
Figure 9:
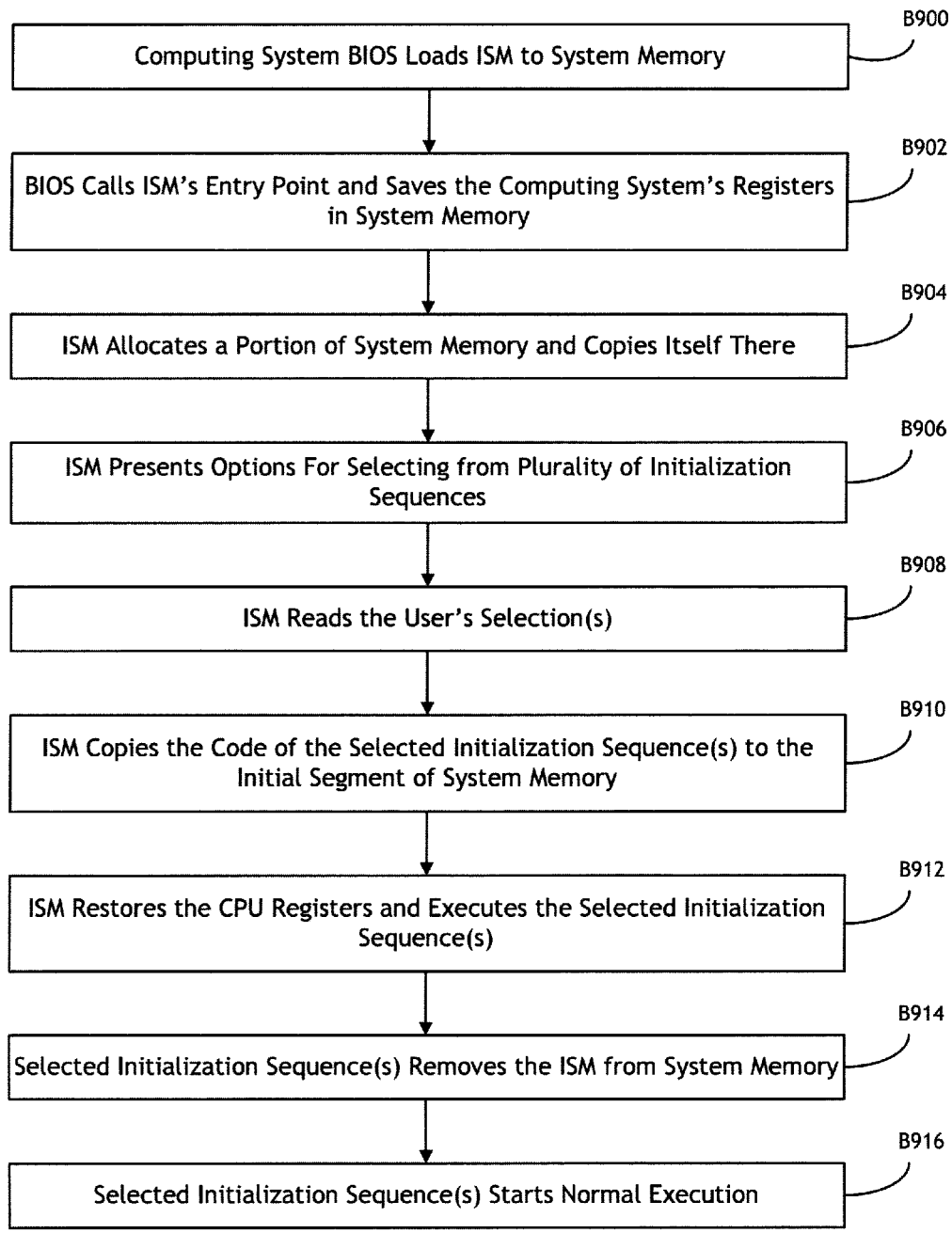
FIG. 9 is a flowchart illustrating a method according to the present embodiments.

FIGS. 5-8 illustrate the contents of the system memory 28 at various points along the sequence of blocks in the process flow of FIG. 9. With reference to FIG. 9, at block B900 the computing system BIOS reads the ISM 80 from the adapter storage 37 and loads it into the system memory 28. In certain embodiments, the ISM 80 is loaded into an upper memory area (UMA) 82, as shown in FIG. 5. The UMA 82 refers to memory between the addresses of 640 KB and 1024 KB (0xA0000-0xFFFFF). On some systems, such as IBM PC's, the UMA is reserved for read-only memory (ROM), random access memory (RAM) on peripheral devices, and memory-mapped input/output. The illustrated system memory 28 also includes conventional memory 84, which is the first 640 KBs (640×1024 bytes) of the memory. The conventional memory 84 is the read-write memory usable by the system's operating system and application programs.

With reference to FIG. 9, at block B902 the computing system BIOS executes the ISM 80. Also at block B902, the computing system BIOS saves the information stored in the registers 86 (FIG. 1) in the system memory 28. A hardware register stores bits of information in such a way that all the bits can be written to or read out simultaneously. Typical uses of hardware registers include configuration and startup of certain features, especially during initialization, and status reporting, such as whether a certain event has occurred in the hardware unit. As detailed later, the present embodiments save the information stored in the registers 86 in the system memory 28 so that the registers can be restored later.

Figure 6:
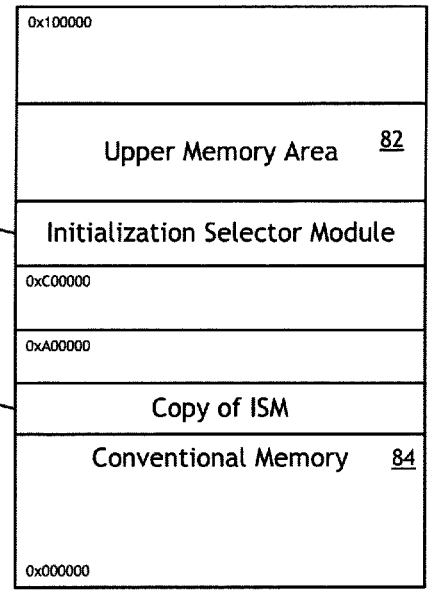
FIG. 6 is a functional block diagram of a memory device illustrating contents of the memory at another point of a method according to the present embodiments.
Figure 7:
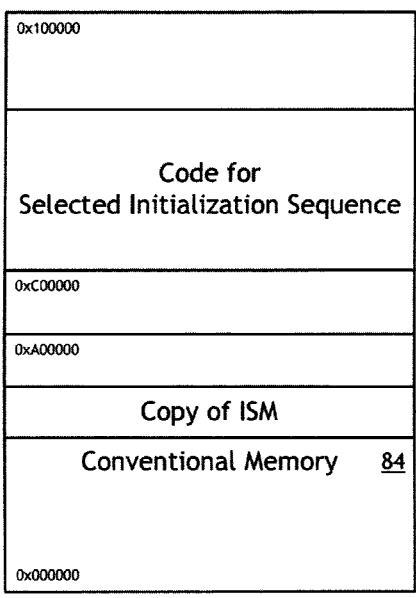
FIG. 7 is a functional block diagram of a memory device illustrating contents of the memory at another point of a method according to the present embodiments.
Figure 8:
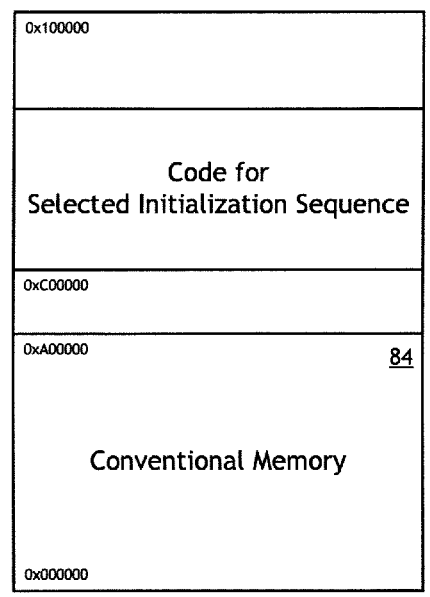
FIG. 8 is a functional block diagram of a memory device illustrating contents of the memory at another point of a method according to the present embodiments.

At block B904, the ISM 80 allocates a portion of the system memory 28 and copies itself to the allocated memory portion. In certain embodiments, the ISM 80 is copied into the conventional memory 84, as shown in FIG. 6. At block B906, the ISM 80 presents options for choosing one or more initialization sequences to be executed. In certain embodiments, the options are presented to a user on a user interface, which includes a display device (not shown). The user interface may be, for example, a command line interface or a graphical user interface (GUI). The user makes one or more selections from the presented options. In certain embodiments, the user may make multiple selections. For example, if the adapter 14 has four functions, the user may make up to four selections, selecting one initialization sequence for each function. If the user does not make a selection for a given function, a default initialization sequence may execute for that function.

At block B908, the ISM 80 reads the user's selection(s) of the initialization sequence(s). Then, at block B910, the ISM 80 reads the code of the selected initialization sequence(s) from the adapter storage 37 and copies the code to the system memory 28. In certain embodiments, the code of the selected initialization sequence(s) is copied to the initial segment of the system memory 28. Where the user selects multiple initialization sequences for multiple functions, the code for each sequence may be copied to system memory successively. For example, the selected code for Function 0 is copied to system memory and then executed, then the selected code for Function 1 is copied to system memory and then executed, etc . . .

At block B912, the ISM 80 restores the information stored in the registers 86 by copying the information from the system memory 28 (copied at block B902) back to the registers 86. Also at block B912, the ISM 80 executes the selected initialization sequence(s). At block B914, the selected initialization sequence(s) removes the ISM 80 from the system memory 28. In certain embodiments, the code of each initialization sequence may include a provision for performing this step. At block B916, the selected initialization sequence(s) begins normal execution.

The foregoing embodiments advantageously enable selection of initialization sequences for adapters. These embodiments thus solve the prior art problem of certain initialization sequences being bypassed when another initialization sequence for the same function gets executed. The present embodiments also enable adapters to be more versatile and customizable.

The above description presents the best mode contemplated for carrying out the present selectable initialization for adapters, and of the manner and process of making and using it, in such full, clear, concise, and exact terms as to enable any person skilled in the art to which it pertains to make and use this selectable initialization for adapters. This selectable initialization for adapters is, however, susceptible to modifications and alternate constructions from that discussed above that are fully equivalent. Consequently, this selectable initialization for adapters is not limited to the particular embodiments disclosed. On the contrary, this selectable initialization for adapters covers all modifications and alternate constructions coming within the spirit and scope of the selectable initialization for adapters as generally expressed by the following claims, which particularly point out and distinctly claim the subject matter of the selectable initialization for adapters.

What is claimed is:

1. A machine-implemented method for enabling an adapter coupled to a computing system to be initialized according to one or more of a plurality of initialization sequences stored at adapter storage, the computing system including a processor for executing processor-executable instructions and a plurality of registers for storing information, the adapter including a plurality of functions, wherein more than one of the plurality of initialization sequences is associated with a first one of the functions, the method comprising:

executable system BIOS (basic input/output system) of the computing system loading an initialization selector module (ISM) into memory of the computing system from the adapter storage, wherein the ISM is read prior to any of the initialization sequences;

the system BIOS executing the ISM and saving the information stored in the registers in the system memory;

the ISM allocating a portion of the system memory and copying itself to the allocated memory portion;

the ISM presenting a user with options to choose one or more of the initialization sequences to be executed;

the ISM reading a user selection of one of the plurality of initialization sequences;

the ISM reading code of the selected initialization sequence and copying the code to the system memory;

the ISM restoring the information stored in the registers and executing the selected initialization sequence;

the selected initialization sequence removing the ISM from the system memory; and the selected initialization sequence beginning normal execution;

wherein any one of the initialization sequences may be executed regardless of how the initialization sequences are stored, and regardless of how many of the functions use a same one of the initialization sequences.

2. The method of claim 1, wherein the ISM is loaded into a portion of the system memory that is normally reserved for initialization code.

3. The method of claim 1, wherein the selected initialization sequence is Preboot Execution Environment (PXE) or Internet Small Computer System Interface (iSCSI) Boot Firmware Table (iBFT).

4. The method of claim 1, wherein the code of the selected initialization sequence is copied to an initial segment of the system memory.

5. An adapter for enabling a computing system to communicate with a plurality of devices in a network, the adapter comprising:

a first interface for enabling the adapter to communicate with the computing system;

a second interface for enabling the adapter to communicate with the network;

a memory for storing processor-executable instructions;

a processor for executing the instructions;

storage for storing an initialization selector module (ISM); and a plurality of functions;

wherein the ISM enables the adapter to be initialized according to one or more of a plurality of initialization sequences based upon at least one user selection;

wherein more than one of the plurality of initialization sequences is associated with a first one of the functions;

wherein the ISM comprises executable code configured to present a user with options to choose one or more of the initialization sequences to be executed;

wherein the ISM comprises executable code configured to be executed prior to the selected initialization sequence; and wherein any one of the initialization sequences may be executed regardless of how the initialization sequences are stored, and regardless of how many of the functions use a same one of the initialization sequences.

6. The adapter of claim 5, wherein each function comprises a logical device including a set of standardized control/status registers that a driver in the computing system may use to communicate with the adapter, and user-defined logic associated with the registers.

7. The adapter of claim 6, wherein the user-defined logic comprises at least one of a control path, a data path, a RISC (reduced instruction set computing) processor, a network interface and a storage interface.

8. A non-transitory computer-readable medium storing executable instructions, which when executed by a computing system, cause the computing system to perform a process for enabling an adapter coupled to the computing system to be initialized according to one or more of a plurality of initialization sequences stored at adapter storage, the computing system including a processor for executing processor-executable instructions and a plurality of registers for storing information, the adapter including a plurality of functions, wherein more than one of the initialization sequences is associated with a first one of the functions, the process comprising:

system BIOS (basic input/output system) of the computing system loading an initialization selector module (ISM) into memory of the computing system from the adapter storage, wherein the ISM is read prior to any of the initialization sequences;

the system BIOS executing the ISM and saving the information stored in the registers in the system memory;

the ISM allocating a portion of the system memory and copying itself to the allocated memory portion;

the ISM presenting a user with options to choose one or more of the initialization sequences to be executed;

the ISM reading a user selection of one of the plurality of initialization sequences;

the ISM reading code of the selected initialization sequence and copying the code to the system memory;

the ISM restoring the information stored in the registers and executing the selected initialization sequence;

the selected initialization sequence removing the ISM from the system memory; and the selected initialization sequence beginning normal execution;

wherein any one of the initialization sequences may be executed regardless of how the initialization sequences are stored, and regardless of how many of the functions use a same one of the initialization sequences.

9. The machine-readable storage medium of claim 8, wherein the ISM is loaded into a portion of the system memory that is normally reserved for initialization code.

10. The machine-readable storage medium of claim 8, wherein the selected initialization sequence is Preboot Execution Environment (PXE) or Internet Small Computer System Interface (iSCSI) Boot Firmware Table (iBFT).

11. The machine-readable storage medium of claim 8, wherein the code of the selected initialization sequence is copied to an initial segment of the system memory.

12. A network device for enabling a computing system to communicate with a plurality of other devices in a network, the network device comprising:

a first interface for enabling the network device to communicate with the computing system;

a second interface for enabling the network device to communicate with the network;

a memory for storing processor-executable instructions;

a processor for executing the instructions;

storage for storing an initialization selector module (ISM); and a plurality of functions;

wherein the ISM enables the network device to be initialized according to one or more of a plurality of initialization sequences based upon at least one user selection;

wherein more than one of the plurality of initialization sequences is associated with a first one of the functions;

wherein the ISM comprises executable code configured to present a user with options to choose one or more of the initialization sequences to be executed;

wherein the ISM comprises executable code configured to be executed prior to the selected initialization sequence; and wherein any one of the initialization sequences may be executed regardless of how the initialization sequences are stored, and regardless of how many of the functions use a same one of the initialization sequences.

13. The network device of claim 12, wherein each function comprises a logical device including a set of standardized control/status registers that a driver in the computing system may use to communicate with the network device, and user-defined logic associated with the registers.

14. The network device of claim 13, wherein the user-defined logic comprises at least one of a control path, a data path, a RISC (reduced instruction set computing) processor, a network interface and a storage interface.

* * * * *